United States Patent
Wu et al.

(10) Patent No.: US 11,012,167 B2
(45) Date of Patent: May 18, 2021

(54) DEVICE AND METHOD FOR DETECTING SIGNAL POWER

(71) Applicant: Realtek Semiconductor Corp., HsinChu (TW)

(72) Inventors: Chao-Huang Wu, Taoyuan (TW); Han-Chang Kang, Hsinchu (TW); Ka-Un Chan, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 68 days.

(21) Appl. No.: 16/114,167

(22) Filed: Aug. 27, 2018

(65) Prior Publication Data

US 2019/0190628 A1   Jun. 20, 2019

(30) Foreign Application Priority Data

Dec. 15, 2017  (TW) .................................. 106144116

(51) Int. Cl.
| | |
|---|---|
| *H04B 17/318* | (2015.01) |
| *H04L 27/26* | (2006.01) |
| *H04L 1/20* | (2006.01) |
| *H04W 52/22* | (2009.01) |
| *H04B 17/26* | (2015.01) |
| *H04L 5/00* | (2006.01) |

(52) U.S. Cl.
CPC .......... *H04B 17/318* (2015.01); *H04B 17/26* (2015.01); *H04L 1/20* (2013.01); *H04L 27/2614* (2013.01); *H04W 52/225* (2013.01); *H04L 5/0007* (2013.01); *H04L 27/2647* (2013.01)

(58) Field of Classification Search
CPC ......... H04B 17/26; H04B 17/318; H04L 1/20; H04L 27/2614; H04L 27/2647; H04L 5/0007; H04W 52/225
See application file for complete search history.

(56) References Cited

U.S. PATENT DOCUMENTS

| | | | | |
|---|---|---|---|---|
| 5,488,377 A | * | 1/1996 | Reynolds, III | ........ G01S 7/2927 342/91 |
| 2006/0166634 A1 | * | 7/2006 | Ido | .......................... H04B 7/084 455/277.1 |
| 2015/0233981 A1 | | 8/2015 | Kondou | |

* cited by examiner

*Primary Examiner* — Kevin C. Harper
*Assistant Examiner* — Derrick V Rose
(74) *Attorney, Agent, or Firm* — Winston Hsu

(57) ABSTRACT

A receiving device comprises a first receiving circuit, for receiving a plurality of signals and comparing a plurality of signal powers of the plurality of signals with a first threshold, to generate a first plurality of comparison results; a second receiving circuit, for receiving the plurality of signals and comparing the plurality of signal powers of the plurality of signals with a second threshold, to generate a second plurality of comparison results, wherein the first threshold is smaller than the second threshold; and a control circuit, coupled to the first receiving circuit and the second receiving circuit, for determining whether an average signal power of the plurality of signals is greater than a reference power according to the first plurality of comparison results and the second plurality of comparison results, to generate a determination result.

14 Claims, 4 Drawing Sheets

DEVICE AND METHOD FOR DETECTING SIGNAL POWER

BACKGROUND OF THE INVENTION

1. Field of the Invention

The present invention relates to a device and method used in a communication system, and more particularly, to a device and method for detecting signal power.

2. Description of the Prior Art

In a communication system, detection of a signal power is an extremely important topic. However, there are various kinds of signals, and the signals may have different types of modulation or high peak to average power ratios (PAPRs). In this case, the signal power changes fast and enormously such that the receiver is not able to detect the signal power correctly.

Thus, how to detect the signal power accurately is an important problem to be solved.

SUMMARY OF THE INVENTION

The present invention therefore provides a receiving device and a receiving method for detecting signal power, to solve the above problem.

A receiving device comprises a first receiving circuit, for receiving a plurality of signals and comparing a plurality of signal powers of the plurality of signals with a first threshold, to generate a first plurality of comparison results; a second receiving circuit, for receiving the plurality of signals and comparing the plurality of signal powers of the plurality of signals with a second threshold, to generate a second plurality of comparison results, wherein the first threshold is smaller than the second threshold; and a control circuit, coupled to the first receiving circuit and the second receiving circuit, for determining whether an average signal power of the plurality of signals is greater than a reference power according to the first plurality of comparison results and the second plurality of comparison results, to generate a determination result.

A receiving method comprises receiving a plurality of signals and comparing a plurality of signal powers of the plurality of signals with a first threshold, to generate a first plurality of comparison results; receiving the plurality of signals and comparing the plurality of signal powers of the plurality of signals with a second threshold, to generate a second plurality of comparison results, wherein the first threshold is smaller than the second threshold; and determining whether an average signal power of the plurality of signals is greater than a reference power according to the first plurality of comparison results and the second plurality of comparison results, to generate a determination result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
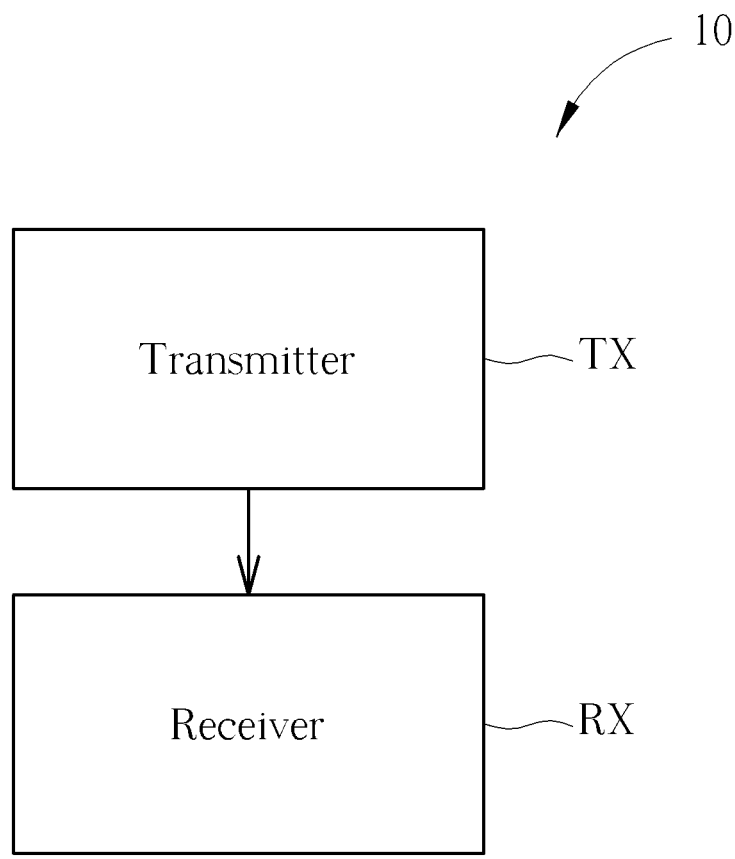
FIG. 1 is a schematic diagram of a communication system according to an example of the present invention.

FIG. 1 is a schematic diagram of a communication system 10 according to an example of the present invention. The communication system 10 may be any communication system using an orthogonal frequency-division multiplexing (OFDM) technique (or termed as discrete multi-tone modulation (DMT) technique), and is briefly composed of a transmitter TX and a receiver RX. In FIG. 1, the transmitter TX and the receiver RX are utilized for illustrating a structure of the communication system 10. For example, the communication system 10 may be any wired communication system such as an asymmetric digital subscriber line (ADSL) system, a power line communication (PLC) system or an Ethernet over coax (EOC), or may be any wireless communication system such as a wireless local area network (WLAN), a Digital Video Broadcasting (DVB) system, a Long Term Evolution (LTE) system or a Long Term Evolution-advanced (LTE-A) system. In addition, the transmitter TX and the receiver RX may be installed in any device such as a mobile phone, a laptop, etc., but is not limited herein.

Figure 2:
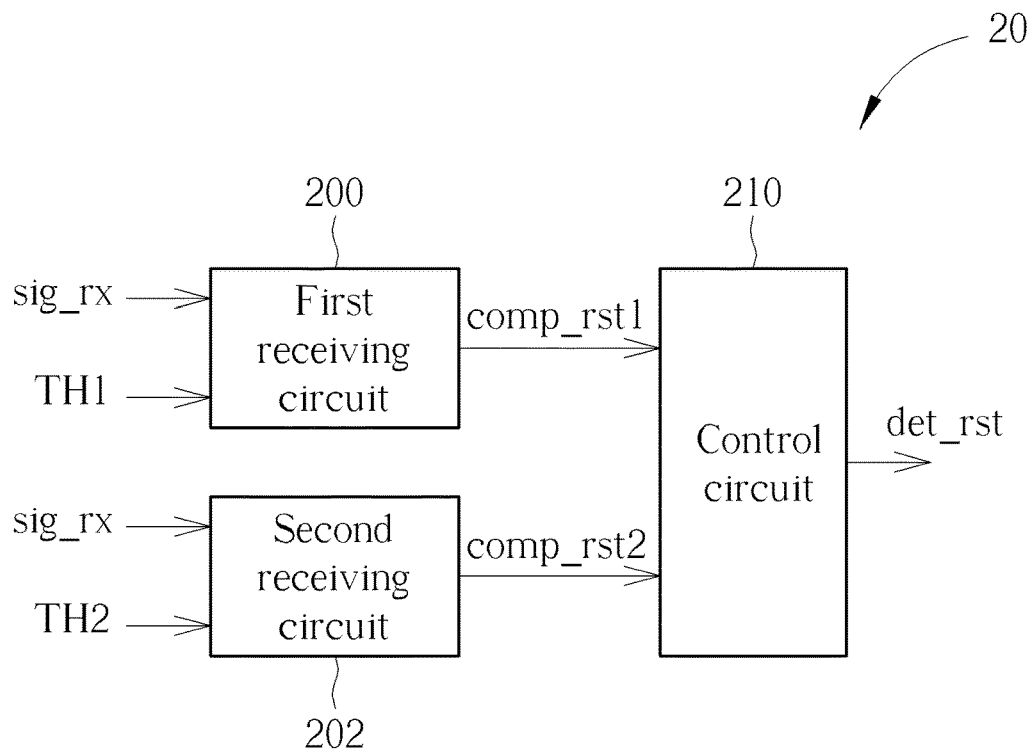
FIG. 2 is a schematic diagram of a receiving device according to an example of the present invention.

FIG. 2 is a schematic diagram of a receiving device 20 according to an example of the present invention. The receiving device 20 is utilized in the receiver RX of FIG. 1 for detecting (e.g., determining) a signal power. The receiving device 20 includes a first receiving circuit 200, a second receiving circuit 202 and a control circuit 210. In detail, the first receiving circuit 200 receives a plurality of signals sig_rx and compares a plurality of signal powers of the plurality of signals sig_rx with a first threshold TH1, to generate a first plurality of comparison results comp_rst1. The second receiving circuit 202 receives the plurality of signals sig_rx and compares the plurality of signal powers of the plurality of signals sig_rx with a second threshold TH2, to generate a second plurality of comparison results comp_rst2. The control circuit 210 is coupled to the first receiving circuit 200 and the second receiving circuit 202, for determining whether an average signal power of the plurality of signals sig_rx is greater than a reference power according to the first plurality of comparison results comp_rst1 and the second plurality of comparison results comp_rst2, to generate a determination result det_rst. For example, the determination result det_rst is a bit "1" if the average signal power is greater than the reference power; otherwise, the determination result det_rst is a bit "0".

That is, the plurality of signals sig_rx may have different types of modulation or higher peak to average power ratios (PAPRs) which cause the signal powers to change fast and enormously, such that the receiver is not able to detect the signal powers of the plurality of signals sig_rx correctly. The effect caused by the types of modulation and the PAPRs to the comparison result can be reduced by generating the comparison result using the two thresholds according to the present invention. Thus, the receiving device 20 may detect the signal powers of the plurality of signals sig_rx correctly. In other words, the uncertainty of detecting the signal powers caused by the characteristics of the signals can be compensated by using the two thresholds.

Figure 3:
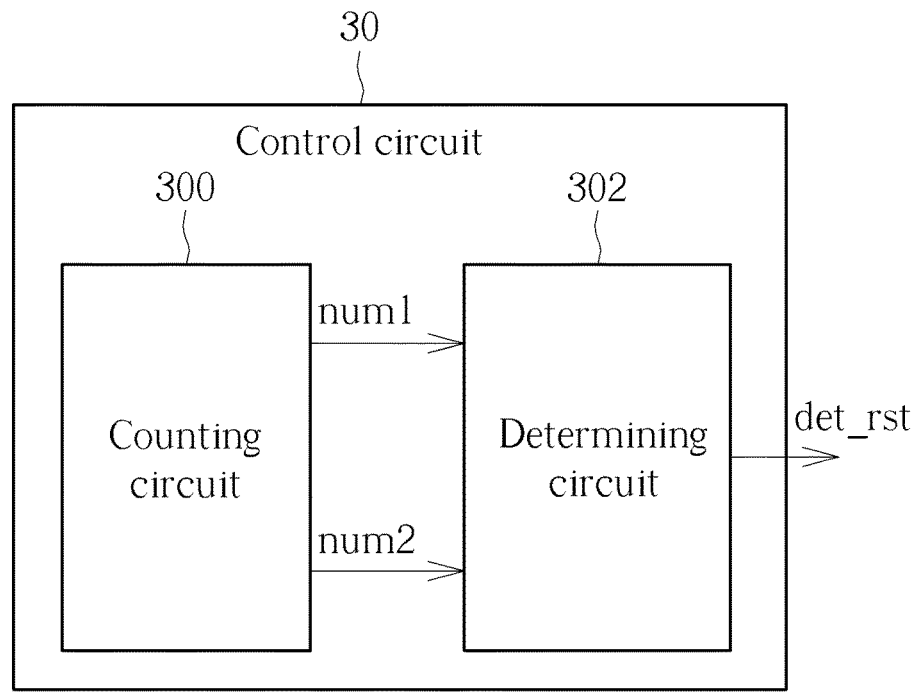
FIG. 3 is a schematic diagram of a control circuit according to an example of the present invention.

FIG. 3 is a schematic diagram of a control circuit 30 according to an example of the present invention. The control circuit 30 may be utilized for realizing the control circuit 210 in FIG. 2. The control circuit 30 includes a counting circuit 300 and a determining circuit 302. In detail, the counting circuit 300 is coupled to the first receiving circuit 200 and the second receiving circuit 202, for generating a first count num1 according to the first plurality of comparison results comp_rst1, and for generating a second count num2 according to the second plurality of comparison results comp_rst2, wherein the signal powers of the first count num1 of signals of the plurality of signals sig_rx are greater than the first threshold TH1, and the signal powers of the second count num2 of signals of the plurality of signals sig_rx are greater than the second threshold TH2. The determining circuit 302 is coupled to the counting circuit 300, for generating the determination result det_rst. The determination result det_rst indicates that the average signal power of the plurality of signals sig_rx is greater than the reference power, if the second count num2 is greater than a product of the first count num1 and a constant (the constant is a real number between 0 and 1). The determination result det_rst indicates that the average signal power of the plurality of signals sig_rx is not greater than the reference power, if the second count num2 is not greater than the product. That is, the determining circuit 302 compares a count of signals where signal powers of the signals is greater than the first threshold TH1 and a count of signals where signal powers of the signals is greater than the second threshold TH2, to determine whether the average signal powers of the plurality of signals sig_rx is greater than the reference power.

In one example, the determining circuit 302 may be realized according to a polynomial to increase the accuracy of the determination. For example, the determination result det_rst indicates that the average signal power of the plurality of the signals sig_rx is greater than the reference power, if the second count num2 is greater than the polynomial of the first count num1 ($a_n \cdot (num1)^n + a_{n-1} \cdot (num1)^{n-1} + \ldots + a_1 \cdot (num1) + a_0$, wherein all the coefficients $a_n, a_{n-1}, \ldots, a_1$ are real numbers between 0 and 1, and the coefficient $a_0$ may be a value). The determination result det_rst indicates that the average signal power of the plurality of the signals sig_rx is not greater than the reference power, if the second count num2 is not greater than the polynomial.

In one example, the constant and the coefficients of the polynomial are related to a system parameter such as the reference power, e.g., the constant and the coefficients may be obtained according to simulations or experiments, but is not limited herein. In one example, the plurality of signals sig_rx are a plurality of OFDM signals. In one example, the first threshold TH1 and the second threshold TH2 are related to the system parameter such as the reference parameter. In one example, the first receiving circuit 200 and the second receiving circuit 202 receive the plurality of signals sig_rx in a time period.

Figure 4:
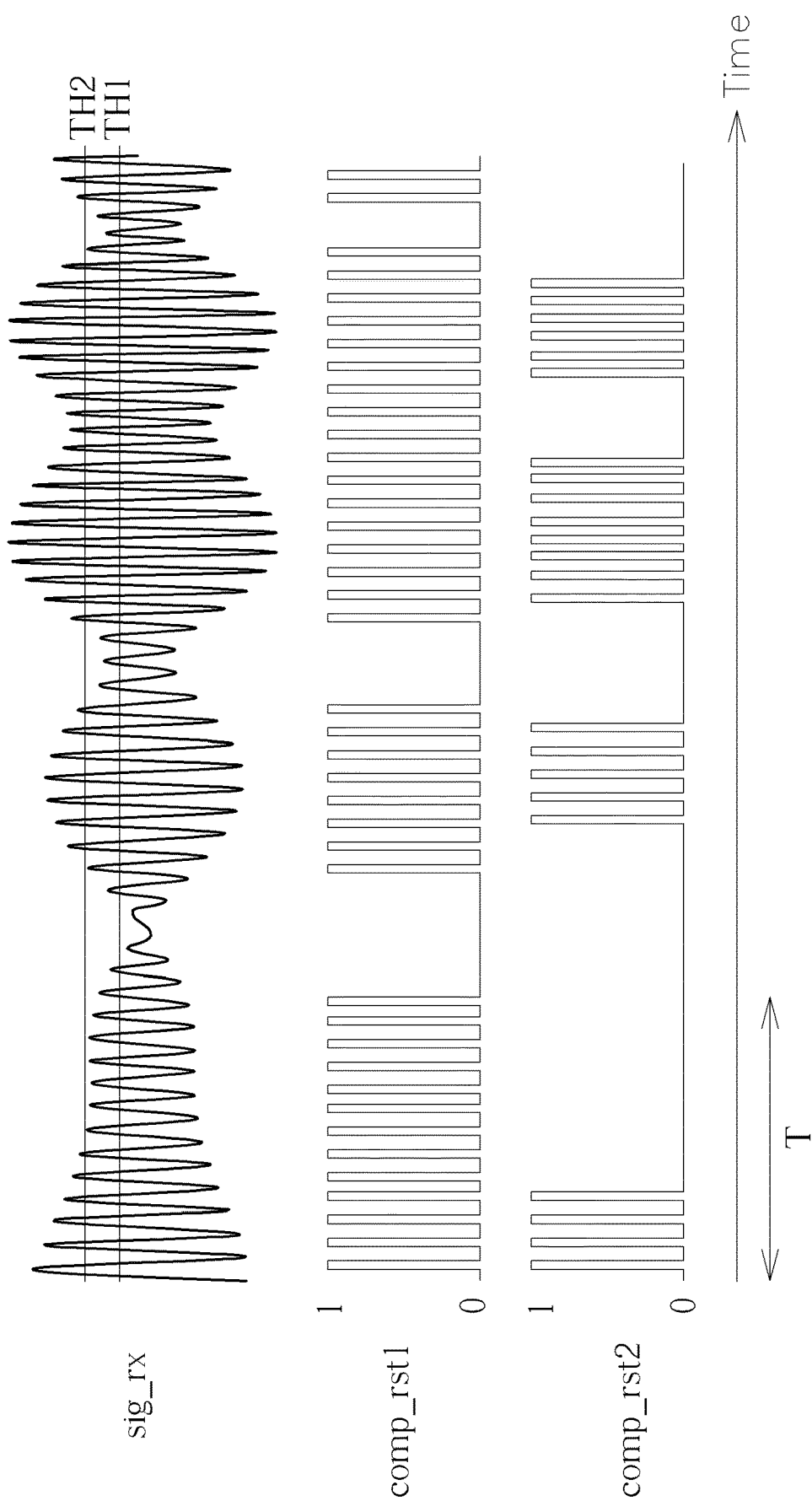
FIG. 4 is a schematic diagram of detecting signal powers of a plurality of signals according to an example of the present invention.

FIG. 4 is a schematic diagram of detecting signal powers of a plurality of signals according to an example of the present invention. The receiving device 20 compares the signal powers of the plurality of signals sig_rx with the first threshold TH1 and the second threshold TH2 separately, after receiving the plurality of signals sig_rx in a time period T. In detail, the receiving device 20 outputs a bit "1" if the signal power is greater than the first threshold TH1, when generating the first plurality of comparison results comp_rst1; otherwise, the receiving device 20 outputs a bit "0".

The receiving device 20 outputs the bit "1" if the signal power is greater than the second threshold TH2, when generating the second plurality of comparison results comp_rst2; otherwise, the receiving device 20 outputs the bit "0". Then, the receiving device 20 calculates the count of the signal powers that are greater than the first threshold TH1 is 13, and calculates the count of the signal powers that are greater than the second threshold TH2 is 4.

In one example, assuming that the constant is 0.4, the receiving device 20 obtains: 4<13·0.4. Thus, the receiving device 20 generates a determination result which indicates that the average power of the plurality of signals sig_rx is smaller than the reference power. In another example, assuming that the constant is 0.2, the receiving device 20 obtains: 4>13·0.2. Thus, the receiving device 20 generates a determination result which indicates that the average power of the plurality of signals sig_rx is greater than the reference power. As mentioned previously, the setting of the constant may be related to the system parameter such as the reference power, and is not narrated herein.

In one example, assuming a polynomial of $a_2 \cdot 13^2 + a_1 \cdot 13 + a_0$. The receiving device 20 generates a determination result which indicates that the average power of the plurality of signals sig_rx is smaller than the reference power, if the receiving device 20 determines $4 < a_2 \cdot 13^2 + a_1 \cdot 13 + a_0$. In another example, the receiving device 20 generates a determination result which indicates that the average power of the plurality of signals sig_rx is greater than the reference power, if the receiving device 20 determines $4 > a_2 \cdot 13^2 + a_1 \cdot 13 + a_0$. As mentioned previously, the setting of the constant may be related to the system parameter such as the reference power, and is not narrated herein.

Figure 5:
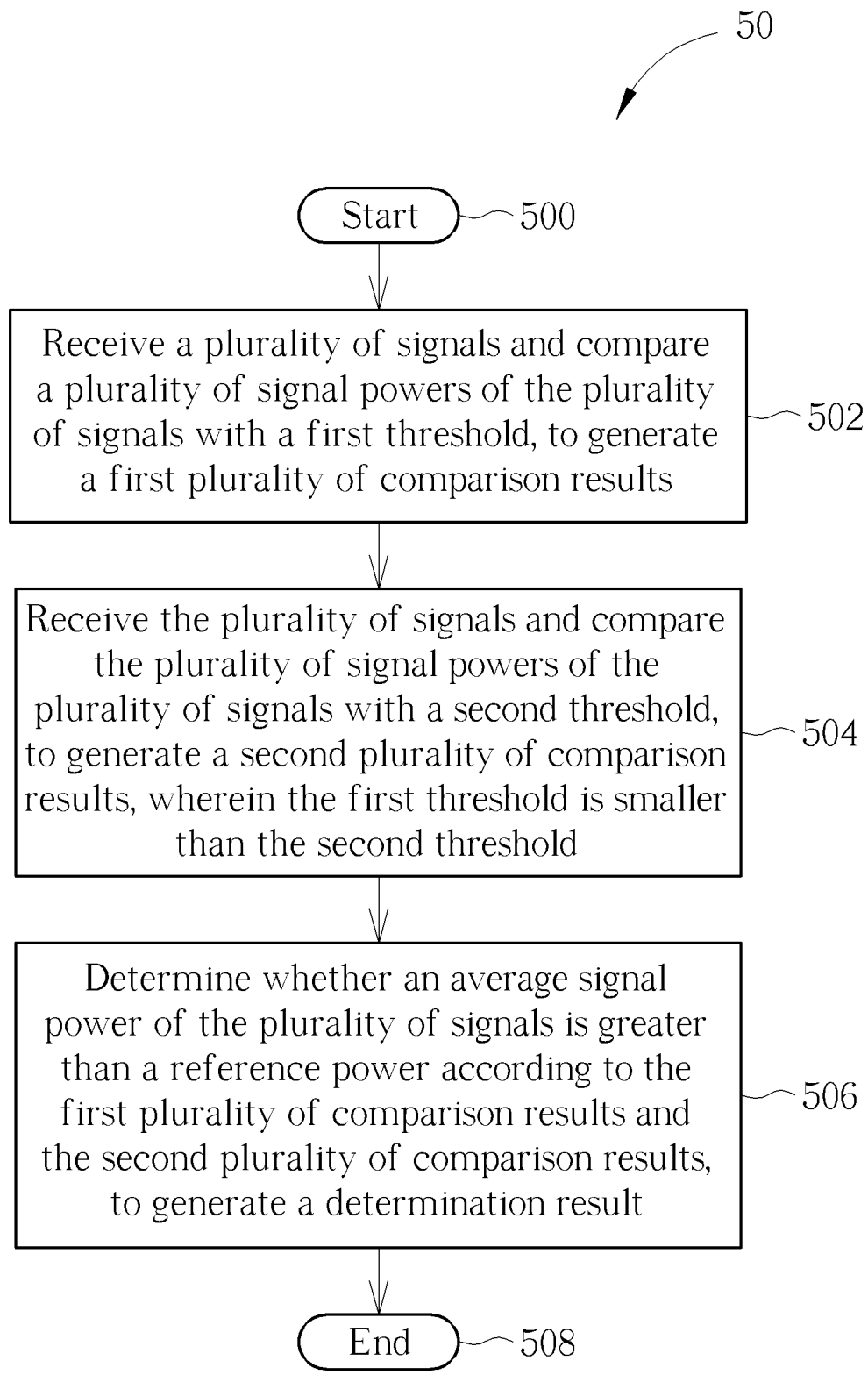
FIG. 5 is a flowchart of a process according to an example of the present invention.

FIG. 5 is a flowchart of a process 50 according to an example of the present invention, for illustrating the operations of the receiving device 20. The process 50 includes the following steps:

Step 500: Start.

Step 502: Receive a plurality of signals and compare a plurality of signal powers of the plurality of signals with a first threshold, to generate a first plurality of comparison results.

Step 504: Receive the plurality of signals and compare the plurality of signal powers of the plurality of signals with a second threshold, to generate a second plurality of comparison results, wherein the first threshold is smaller than the second threshold.

Step 506: Determine whether an average signal power of the plurality of signals is greater than a reference power according to the first plurality of comparison results and the second plurality of comparison results, to generate a determination result.

Step 508: End.

It should be noticed that the first receiving circuit 200, the second receiving circuit 202 and the control circuit 210 may be integrated into one or multiple circuits, according to design considerations or system requirements. In addition, the receiving device 20 and circuits therein may be implemented by using hardware, software, firmware, an electrical system or combination thereof, but is not limited herein. A signal power in the above description may be referred to a voltage for being processed by a circuit, when implementing the receiving device 20.

To sum up, the present invention provides a device and a control method, to reduce an effect caused by types of modulation and PAPRs by generating a comparison result according to two thresholds. Thus, a receiving device may detect a signal power of a plurality of signals correctly. In addition, the present invention may also avoid a delay caused by the prior art when solving similar problems.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiving device, comprising:
   a first receiving circuit, for receiving a plurality of signals and comparing a plurality of signal powers of the plurality of signals with a first threshold, to generate a first plurality of comparison results;
   a second receiving circuit, for receiving the plurality of signals and comparing the plurality of signal powers of the plurality of signals with a second threshold, to generate a second plurality of comparison results, wherein the first threshold is smaller than the second threshold; and
   a control circuit, coupled to the first receiving circuit and the second receiving circuit, for determining whether an average signal power of the plurality of signals is greater than a reference power according to the first plurality of comparison results and the second plurality of comparison results, to generate a determination result;
   wherein the control circuit comprises:
   a counting circuit, coupled to the first receiving circuit and the second receiving circuit, for generating a first count according to the first plurality of comparison results, and for generating a second count according to the second plurality of comparison results, wherein the signal powers of the first count of signals of the plurality of signals are greater than the first threshold, and the signal powers of the second count of signals of the plurality of signals are greater than the second threshold; and
   a determining circuit, coupled to the counting circuit, for generating the determination result, wherein the determination result indicates that the average signal power of the plurality of signals is greater than the reference power, if the second count is greater than a product of the first count and a constant, and the determination result indicates that the average signal power of the plurality of signals is not greater than the reference power, if the second count is not greater than the product.

2. The receiving device of claim 1, wherein the constant is related to the reference power.

3. The receiving device of claim 1, wherein
   the determination result indicates that the average signal power of the plurality of signals is greater than the reference power, if the second count is greater than a polynomial of the first count where at least one coefficient of the polynomial is a real number between 0 and 1, and the determination result indicates that the average signal power of the plurality of signals is not greater than the reference power, if the second count is not greater than the polynomial.

4. The receiving device of claim 3, wherein the at least one coefficient is related to the reference power.

5. The receiving device of claim 1, wherein the plurality of signals are a plurality of orthogonal frequency division multiplexing (OFDM) signals.

6. The receiving device of claim 1, wherein the first threshold and the second threshold are related to the reference power.

7. The receiving device of claim 1, wherein the first receiving circuit and the second receiving circuit receive the plurality of signals in a time period.

8. A receiving method, comprising:
   receiving a plurality of signals and comparing a plurality of signal powers of the plurality of signals with a first threshold, to generate a first plurality of comparison results;
   receiving the plurality of signals and comparing the plurality of signal powers of the plurality of signals with a second threshold, to generate a second plurality of comparison results, wherein the first threshold is smaller than the second threshold;
   determining whether an average signal power of the plurality of signals is greater than a reference power according to the first plurality of comparison results and the second plurality of comparison results, to generate a determination result;
   generating a first count according to the first plurality of comparison results, and generating a second count according to the second plurality of comparison results, wherein the signal powers of the first count of signals of the plurality of signals are greater than the first threshold, and the signal powers of the second count of signals of the plurality of signals are greater than the second threshold; and
   generating the determination result, wherein the determination result indicates that the average signal power of the plurality of signals is greater than the reference power, if the second count is greater than a product of the first count and a constant, and the determination result indicates that the average signal power of the plurality of signals is not greater than the reference power, if the second count is not greater than the product.

9. The receiving method of claim 8, wherein the constant is related to the reference power.

10. The receiving method of claim 8,
    wherein the determination result indicates that the average signal power of the plurality of signals is greater than the reference power, if the second count is greater than a polynomial of the first count where at least one coefficient of the polynomial is a real number between 0 and 1, and the determination result indicates that the average signal power of the plurality of signals is not greater than the reference power, if the second count is not greater than the polynomial.

11. The receiving method of claim 10, wherein the at least one coefficient is related to the reference power.

12. The receiving method of claim 8, wherein the plurality of signals are a plurality of orthogonal frequency division multiplexing (OFDM) signals.

13. The receiving method of claim 8, wherein the first threshold and the second threshold are related to the reference power.

14. The receiving method of claim 8, wherein the first receiving circuit and the second receiving circuit receive the plurality of signals in a time period.

* * * * *